(12) United States Patent
Yang et al.

(10) Patent No.: US 7,211,640 B2
(45) Date of Patent: May 1, 2007

(54) PRESSURE SENSITIVE EMULSION ADHESIVE FOR OVER-LAMINATING FILMS, MANUFACTURING METHOD THEREOF AND USE THEREOF

(75) Inventors: Bin-Yen Yang, Taipei (TW); Chi-Lin Kao, Taipei (TW); Chih-Kuo Wan, Taipei (TW); Shu-Hei Lin, San Chung (TW); Shih-Shang Lo, Ji Long (TW)

(73) Assignee: Four Pillars Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/735,252

(22) Filed: Dec. 12, 2003

(65) Prior Publication Data
US 2004/0209996 A1 Oct. 21, 2004

(30) Foreign Application Priority Data
Dec. 12, 2002 (TW) ...................... 91135911 A

(51) Int. Cl.
*C08G 75/00* (2006.01)

(52) U.S. Cl. .................. 528/173; 524/389; 524/459; 524/807; 524/817; 524/833; 526/238.21

(58) Field of Classification Search .............. 524/389, 524/459, 807, 817, 833; 526/238.21
See application file for complete search history.

(56) References Cited

U.S. PATENT DOCUMENTS 3,705,164 A * 12/1972 Honig et al. ................ 524/591
4,617,343 A * 10/1986 Walker et al. ............... 524/817

* cited by examiner

*Primary Examiner*—Terressa Boykin
(74) *Attorney, Agent, or Firm*—J.C. Patents

(57) ABSTRACT

The present invention relates to an emulsion type adhesive applicable for over-laminating films, the preparation and the use thereof. The emulsion type adhesive comprises: (a) 60 to 99.5 parts per hundred of monomers of one or more alkyl acrylates containing 4–12 carbon atoms on the alkyl group; (b) 0.5 to 40 parts per hundred of monomers of an alkyl acrylate containing 1–3 carbon atoms in the alkyl group or an alkyl methacrylate containing 1–6 carbon atoms in the alkyl group; (c) 0.1 to 5 parts per hundred of monomers of dicarboxylic acids; (d) 1 to 5 parts per hundred of a reactive surfactant; (e) 0.1 to 15 parts per hundred of an organic acid vinyl ester; and (f) 100 parts per hundred of soft water, (a) and (b) are 100 parts by hundred, while (c), (d), (e) and (f) are calculated based on the total weight of (a)+(b). The products of this invention have excellent properties.

17 Claims, No Drawings

PRESSURE SENSITIVE EMULSION ADHESIVE FOR OVER-LAMINATING FILMS, MANUFACTURING METHOD THEREOF AND USE THEREOF

CROSS-REFERENCE TO RELATED APPLICATION

This application claims the priority benefit of Taiwan application serial no. 91135911, filed on Dec. 12, 2002.

BACKGROUND OF THE INVENTION

1. Field of Invention

The present invention relates to an adhesive. More particularly, the present invention relates to a pressure-sensitive emulsion adhesive for over-laminating films, the fabrication method and the use thereof.

2. Description of Related Art

In general, the over-laminating film tapes can be applied to protect the prints of hot transfer printing, ink-jet printing, planography, gravure printing or letterpress from the damages of sun and moist. There are two types of over-laminating film tapes. For the first type of the over-laminating tapes, the structure of the tape includes a stacked structure of a substrate (generally biaxially oriented polypropylene film), an adhesive and a mold-release paper. During application, the tape is adhered to the object after peeling off the mold-release paper. The second type of over-laminating tapes has a three-layered structure of a substrate, an adhesive and a mold-release agent, which is directly applied and adhered to the object.

For the first type of the over-laminating tapes, the adhesion between the adhesive and the mold-release paper should be weak so as to be peeled easily. Generally, for the fabrication of the tape, the mold-release paper is coated with the adhesive, oven-dried and then attached to the substrate (coating transfer method). For this type of the over-laminating tapes, the mold-release paper has to be peeled off before the tape is adhered to the target object, which increase the production costs and is environmental unfriendly due to the disposal of the mold-release papers.

For the second type of the over-laminating tapes, one side of the substrate is coated with the mold-release agent (mold-release layer) and the other side of the substrate is coated with the adhesive, without using the mold-release paper. The adhesion of the mold-release layer relative to that of the adhesive layer should be carefully controlled, so that no white lines (peeling marks) are present if applied. When the mold-release agent is a silicon series mold-release agent, incomplete bridging may occurs and the mold-release agent is transferred to the surface of the glue, thus deteriorating the physical properties or transparency. Moreover, the silicone series mold-release agent is expensive. If the mold-release agent is a non-silicon series mold-release agent, problems of non-uniformity exist and unstable adhesion may result in the mold-release agent being transferred to the surface of the glue.

On the other hand, if the adhesive is directly coated to the surface of the substrate to form the over-laminating tapes without using the mold-release agent, the adhesion is stable and no white lines are present when applied, thus obtaining the over-laminating tapes of low costs and high quality.

The adhesives used for such over-laminating tapes includes emulsion type rubber series adhesives, emulsion type acrylic series adhesives, solvent type acrylic series adhesives and non-solvent type adhesives. The acrylic series adhesives are widely adopted for having good weather durability, adhesion, stability over time, and transparency. Compared with the acceptance of the emulsion type acrylic series adhesives in recent days, the solvent type acrylic adhesives are more expensive and may cause impacts to the ecology for containing organic solvents.

However, the conventional emulsion type acrylic series adhesives also have the disadvantages of poor waterproofness, easily turning yellow, higher occurrence of white lines and less adhesion in involution. Thus, for wider application, these problems need to be solved.

SUMMARY OF THE INVENTION

The present invention provides an emulsion type adhesive for over-laminating films, wherein the emulsion type adhesive is coated on the polypropylene films. By the application of the adhesive, the prior problems of poor waterproofness, easily turning yellow and higher occurrence of white lines are alleviated.

The present invention proves an emulsion type adhesives for over-laminating films, which is coated on the polypropylene films for improving transparency.

As embodied and broadly described herein, the present invention provides an emulsion type adhesive for over-laminating films. The emulsion type adhesive comprises: (a) 60 to 99.5 parts per hundred of monomers of one or more alkyl acrylates containing 4–12 carbon atoms on the alkyl group; (b) 0.5 to 40 parts per hundred of monomers of an alkyl acrylate containing 1–3 carbon atoms in the alkyl group or an alkyl methacrylate containing 1–6 carbon atoms in the alkyl group; (c) 0.1 to 5 parts per hundred of monomers of dicarboxylic acids; (d) 1 to 5 parts per hundred of a reactive surfactant; (e) 0.1 to 15 parts per hundred of an organic acid vinyl ester; and (f) 100 parts per hundred of soft water, (a) and (b) are 100 parts by hundred, while (c), (d), (e) and (f) are calculated based on the total weight of (a)+(b).

It is to be understood that both the foregoing general description and the following detailed description are exemplary, and are intended to provide further explanation of the invention as claimed.

DESCRIPTION OF THE PREFERRED EMBODIMENTS

The present invention provides an emulsion type adhesive for over-laminating films.

The emulsion type adhesive can be produced by any available method using synthesized monomers. According to the preferred embodiment, the composition of the emulsion type adhesive comprises monomers of:

(a) 60 to 99.5 parts per hundred of one or more alkyl acrylates containing 4–12 carbon atoms on the alkyl group, for example, butyl acrylate, 2-ethyl hexyl acrylate, i-butyl acrylate, n-triethyl acrylate or i-octyl acrylate; (b) 0.5 to 40 parts per hundred of an alkyl acrylate containing 1–3 carbon atoms in the alkyl group, for example, ethyl acrylate or methyl acrylate or an alkyl methacrylate containing 1–6 carbon atoms in the alkyl group, for example, methyl methacrylate, ethyl methacrylate or butyl methacrylate; (c) 0.1 to 5 parts per hundred of dicarboxylic acids, for example, maleic acid, fumaric acid, itaconic acid or citraconic acid; and (d) 1 to 5 parts per hundred of a reactive surfactant, for example, allyl surfactants (such as S-180A from KAO Company), 2-propenyl surfactants (such as, HS-10.20 or RN-20.30 from FIRST INDUSTRIAL PHARMACEUTICAL COMPANY), maleic surfactants (such as, RA-421 from JAPAN EMULSION COMPANY), itaconic surfactants and acryl surfactants (such as, MS-60 from JAPAN EMULSION COMPANY or RS-30 from SANYO CHEMISTRY COMPANY); (e) 0.1 to 15 parts per hundred of an organic acid vinyl ester, for example, vinyl acetate, vinyl butyrate, vinyl propionate, vinyl isobutyrate or vinyl 2-ethyl hexoate; and (f) 100 parts per hundred of soft water, (a) and (b) are 100 parts by hundred, while (c), (d), (e) and (f) are calculated based on the total weight of (a)+(b).

Since the solvent type adhesives have negative impacts to the ecology and the environment, the emulsion type adhesives are broadly applied. The present invention provides a synthesis method, of which the reactive surfactant reacts with the redox initiators (agents for the reduction and oxidation reaction) under 60° C.

The present invention employs the reactive surfactant for polymerization. In the polymerization reaction, the active surfactant participates in the polymerization and becomes a part of the polymer, thus enhancing the cohesion of the adhesive. The tape that is fabricated by coating the resultant emulsion type adhesive of this invention to the plastic film (such as polypropylene film) through available means possesses better properties, including better transparency of the tape, anchorage of the substrate, waterproofness, weather durability and heatproofness, when compared with the conventional tapes.

The reactive surfactants include, for example, allyl surfactants (such as S-180A from KAO Company), 2-propenyl surfactants (such as, HS-10.20 or RN-20.30 from FIRST INDUSTRIAL PHARMACEUTICAL COMPANY), maleic surfactants (such as, RA-421 from JAPAN EMULSION COMPANY), itaconic surfactants and acryl surfactants (such as, MS-60 from JAPAN EMULSION COMPANY or RS-30 from SANYO CHEMISTRY COMPANY).

The reaction temperature that remains under 60° C. for the redox system in the present invention results in monomers of larger molecular weights with lower residues and less remanent odors. Moreover, the problem of white lines is also improved. The redox initiator used in the present invention can be t-butyl hydroperoxide and Rongalite (trade name), substituting potassium peroxysulfate, for reducing the production of metal ions and preventing the tape turning yellow.

Additionally, it is important to get rid of the oxygen in the reaction tank, because the oxygen gas decreases the effects of the redox initiator. Therefore, the method provided by the present invention includes flowing a nitrogen gas into the reaction tank to expel the oxygen gas, after placing the soft water into the reaction tank.

Moreover, the pH value of the emulsion is controlled to pH 3–5 by adding the buffer solution, for example, 0.2% sodium acetate solution.

The glass transition temperature (Tg) is set between $-35°$ C.$\sim -50°$ C., preferably $-40°$ C.$\sim -45°$ C. for balancing the adhesion and the tack, which can spare the use of expensive oil glue.

Preparation of the Emulsion Type Adhesive for Over-Laminating Films

Soft water (50% relative to the total weight of monomers), surfactant (3% relative to the total weight of monomers), itaconic acid (1% relative to the total weight of monomers), ethyl acrylate or methyl methacrylate (8.6% relative to the total weight of monomers), butyl acrylate (40.5% relative to the total weight of monomers), 2-ethyl hexyl acrylate (40% relative to the total weight of monomers) and vinyl acetate (10% relative to the total weight of monomers) are placed in the vessel and stirred thoroughly, to become a milky white emulsion, also called pre-emulsion.

Then, the soft water (50% relative to the total weight of monomers) and 10% sodium acetate solution (0.2% relative to the total weight of monomers) are added to the emulsion and stirred thoroughly. After the stirring is completed, a nitrogen gas is flowed into the emulsion for more than 20 minutes from below the surface of the solution. Under the room temperature, $1/20$ of the amount of the pre-emulsion, $1/5$ of the amount of the oxidizing agent t-butyl peroxide and $1/5$ of the amount of the reducing agent Rongalite are added to the vessel, and then heated to 25–55° C. and stirred for 30 minutes. The temperature is lowered to 40–50° C., and the remaining ($19/20$) pre-emulsion is added slowly to the vessel together with the remaining oxidizing agent and the reducing agent. After the reaction is complete, the mixture is heated and stirred to remove the un-reacted redox initiators and the un-reacted monomers.

The tests for physical properties of the product are shown in Table.

TABLE

| Tests | |
| --- | --- |
| Tests | Method for testing |
| PH | PH measured by Basic pH meter from Denver Instrument Inc. |
| Viscosity (cps) | Viscosity (cps): measured by Brookfield LV spindle set #2, 30 rpm. |
| Degree of Yellowness | 2.0 g of sample is put in the oven under 130° C. for 24 hrs and then measured by naked eye for the degree of yellowness, as levels 0–5, level 0 is colorless and level 5 is the most yellowish |
| Transparency | The polypropylene film substrate coated with the glue in a size of 50 mm × 100 mm and the glue thickness of 0.015 mm, 9 laminated layers, in the oven under 60° C. for 7 days for testing whether it turns yellow |
| Tack (kg/in) | The rolling ball: stainless steel ball with a diameter of 7/32 inches (#7) or 14/32 inches (14). The sample tape with a size of 50 × 300 mm, the tape placed on the table and the glued surface facing upwards. The ball rolls down from the top point along the glued surface and the rolling distance is measured. |

The emulsion type adhesives for over-laminating films in the present invention are synthesized by the redox synthesis methods with the reaction temperature under 60° C.

EXAMPLE 1

Preparation for an Emulsion Type Adhesive Suitable for the Over-laminating Films 150 g of soft water, 24 g of surfactant (40% solution), 3 g of itaconic acid, 27 g of methyl methacrylate, 128 g of butyl acrylate, 120 g of 2-ethyl hexyl acrylate and 30 g of vinyl acetate are placed in the beaker and stirred thoroughly to become a milky white pre-emulsion.

Then, 150 g of soft water and 6 g of 10% sodium acetate solution are added to the emulsion and stirred thoroughly. After the stirring is completed, a nitrogen gas is flowed into the emulsion for more than 20 minutes from below the surface of the solution.

Under the room temperature, 23.6 g of (1/20 of the amount) of the pre-emulsion, 3 g of (1/5 of the amount) of the oxidizing agent t-butyl peroxide (4% solution) and 3 g of (4% solution) of the reducing agent Rongalite are added to the reaction tank, and then heated up and reacted for 30 minutes. The reaction solution turns blue and the temperature is lowered to 40–50° C. The remaining (19/20) pre-emulsion is added slowly to the reaction tank. 12 g of the oxidizing agent and 12 g of the reducing agent are added slowly to the reaction tank then. After the reaction is complete, the mixture is heated and stirred to remove the un-reacted redox initiators and the un-reacted monomers.

The physical properties of the resultant product are listed in Table 1.

TABLE 1

| | |
|---|---|
| PH | 3.9 |
| Viscosity (30 rpm/#2) | 385 cps |
| The residues of the emulsion filtered by 200 μm and oven dried under 50° C. × 60 minutes | 0.026 g |
| Solid content | 49.02% |
| Degree of Yellowness | 0 |

EXAMPLE 2
Preparation of the Over-laminating Tapes

The emulsion type adhesive suitable of the present invention suitable for the over-laminating films is coated onto a surface of the transparent plastic thin film, so as to obtain a tape. The material of the transparent plastic thin film can be polypropylene or polyester, for example. All the available method for coating can be applied.

Tests:

A layer of the aforementioned emulsion type adhesive is coated onto an electro-static surface of a biaxially oriented polypropylene film. The thickness of the emulsion type adhesive layer is about 0.01–0.015 mm, oven dried under 80° C. for 5 minutes. The tests are performed continuously for 5 times and the average values for the test are used.

The results of tests are listed in Table 2.

TABLE 2

| | |
|---|---|
| Viscosity (kg/25 mm) | 0.38 |
| Tack (cm) | 11.2(#7) |
| Adhesion to biaxially oriented polypropylene film (kg/25 mm). | 0.33 |

EXAMPLE 3
Preparation for an Emulsion Type Adhesive Suitable for the Over-laminating Films 65 g of soft water, 13 g of surfactant (40% solution), 1.8 g of itaconic acid, 15 g of methyl acrylate, 65 g of butyl acrylate, 60 g of 2-ethyl hexyl acrylate and 15 g of vinyl acetate are placed in the beaker and stirred thoroughly to become a milky white pre-emulsion.

Then, 80 g of soft water and 3 g of 10% sodium acetate solution are added to the emulsion and stirred thoroughly. After the stirring is completed, a nitrogen gas is flowed into the emulsion for more than 20 minutes from below the surface of the solution.

Under the room temperature, 13 g of (1/20 of the amount) of the pre-emulsion, 1.6 g of (1/5 of the amount) of the oxidizing agent t-butyl peroxide (4% solution) and 1.6 g of (4% solution) of the reducing agent Rongalite are added to the reaction tank, and then heated up and reacted for 30 minutes. The reaction solution turns blue and the temperature is lowered to 40–50° C. The remaining (19/20) pre-emulsion is added slowly to the reaction tank. 6.4 g of the oxidizing agent and 6.4 g of the reducing agent are added slowly to the reaction tank then. After the reaction is complete, the mixture is heated and stirred to remove the un-reacted redox initiators and the un-reacted monomers.

The physical properties of the resultant product are listed in Table 3.

TABLE 3

| | |
|---|---|
| PH | 4.3 |
| Viscosity (30 rpm/#2) | 320 cps |
| The residues of the emulsion filtered by 200 μm and oven dried under 50° C. × 60 minutes | 0.113 g |
| Solid content | 50.4% |
| Degree of Yellowness | 1 |

EXAMPLE 4
Preparation of the Over-laminating Tapes

The emulsion type adhesive suitable of the present invention suitable for the over-laminating films is coated onto a surface of the transparent plastic thin film, so as to obtain a tape. The material of the transparent plastic thin film can be polypropylene or polyester, for example. All the available method for coating can be applied.

Tests:

A layer of the aforementioned emulsion type adhesive is coated onto an electro-static surface of a biaxially oriented polypropylene film. The thickness of the emulsion type adhesive layer is about 0.01–0.015 mm, oven dried under 80° C. for 5 minutes. The tests are performed continuously for 5 times and the average values for the test are used.

The results of tests are listed in Table 4.

TABLE 4

| | |
|---|---|
| Viscosity (kg/25 mm) | 0.44 |
| Tack (cm) | 3.8(#7) |
| Adhesion to biaxially oriented polypropylene film (kg/25 mm) | 0.40 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An emulsion type adhesive applicable for over-laminating films, the emulsion type adhesive comprising:
    (a) 60 to 99.5 parts per hundred of monomers of one or more alkyl acrylates containing 4–12 carbon atoms in the alkyl group;
    (b) 0.5 to 40 parts per hundred of monomers of an alkyl acrylate or alkyl methacrylate containing 1–3 carbon atoms in the alkyl group;

(c) 0.1 to 5 parts per hundred of monomers of dicarboxylic acids;

(d) 1 to 5 parts per hundred of a reactive surfactant;

(e) 0.1 to 15 parts per hundred of an organic acid vinyl ester; and (f) 100 parts per hundred of soft water, wherein a total weight of (a) and (b) is 100 parts by hundred, while (c), (d), (e) and (f) are calculated relative to the total weight of (a) and (b).

2. The emulsion type adhesive of claim 1, wherein the alkyl acrylate containing 4–12 carbon atoms in the alkyl group is selected from the group consisting of butyl acrylate, 2-ethyl hexyl acrylate, i-butyl acrylate, n-triethyl acrylate and i-octyl acrylate.

3. The emulsion type adhesive of claim 1, wherein the alkyl acrylate containing 1–3 carbon atoms in the alkyl group is ethyl acrylate or methyl acrylate.

4. The emulsion type adhesive of claim 1, wherein the alkyl methacrylate containing 1–3 carbon atoms in the alkyl group is methyl methacrylate or ethyl methacrylate.

5. The emulsion type adhesive of claim 1, wherein the dicarboxylic acid is selected from the group consisting of maleic acid, fumaric acid, itaconic acid and citraconic acid.

6. The emulsion type adhesive of claim 1, wherein the reactive surfactant is selected from the group consisting of an allyl surfactant, an 2-propenyl surfactant, a maleic surfactant, an itaconic surfactant and an acryl surfactant.

7. The emulsion type adhesive of claim 1, wherein the organic acid vinyl ester is selected from the group consisting of vinyl acetate, vinyl butyrate, vinyl propionate, vinyl isobutyrate and vinyl 2-ethyl hexoate.

8. A method for preparing an emulsion type adhesive applicable for over-laminating films, the method comprising:

(a) mixing an alkyl acrylate containing 4–12 carbon atoms in the alkyl group, an alkyl acrylate containing 1–3 carbon atoms in the alkyl group or an alkyl methacrylate containing 1–3 carbon atoms in the alkyl group, a dicarboxylic acid, soft water and an organic acid vinyl ester, and then adding a reactive surfactant so as to obtain a pre-emulsion; and (b) adding at least an oxidizing agent and a reducing agent to the pre-emulsion, followed by stirring, heating and reacting to obtain an emulsion type adhesive.

9. The method of claim 8, wherein a heating temperature in the step (b) is about 25° C.–55° C.

10. The method of claim 8, wherein the alkyl acrylate containing 4–12 carbon atoms in the alkyl group is selected from the group consisting of butyl acrylate, 2-ethyl hexyl acrylate, i-butyl acrylate, n-triethyl acrylate and i-octyl acrylate.

11. The method of claim 8, wherein the alkyl acrylate containing 1–3 carbon atoms in the alkyl group is ethyl acrylate or methyl acrylate.

12. The method of claim 8, wherein the alkyl methacrylate containing 1–3 carbon atoms in the alkyl group is methyl methacrylate or ethyl methacrylate.

13. The method of claim 8, wherein the dicarboxylic acid is selected from the group consisting of maleic acid, fumaric acid, itaconic acid and citraconic acid.

14. The method of claim 8, wherein the reactive surfactant is selected from the group consisting of an allyl surfactant, an 2-propenyl surfactant, a maleic surfactant, an itaconic surfactant and an acryl surfactant.

15. The method of claim 8, wherein the organic acid vinyl ester is selected from the group consisting of vinyl acetate, vinyl butyrate, vinyl propionate, vinyl isobutyrate and vinyl 2-ethyl hexoate.

16. The method of claim 8, wherein the oxidizing agent is t-butyl peroxide and the reducing agent is Rongalite.

17. An over-laminating tape comprises an emulsion type adhesive as claimed in claim 1, wherein the over-laminating tape is fabricated by coating the type adhesive as claimed in claim 1 onto a surface of a transparent plastic film.

* * * * *

UNITED STATES PATENT AND TRADEMARK OFFICE
CERTIFICATE OF CORRECTION

PATENT NO. : 7,211,640 B2 Page 1 of 1
APPLICATION NO. : 10/735252
DATED : May 1, 2007
INVENTOR(S) : Bin-Yen Yang et al.

It is certified that error appears in the above-identified patent and that said Letters Patent is hereby corrected as shown below:

On the Title page of the patent grant, please replace item (73) Assignee's name from "Four Pillars Enterprise Co., Ltd." to --CHIEF INVESTMENT CORP.--

Signed and Sealed this

Eighth Day of April, 2008

JON W. DUDAS
*Director of the United States Patent and Trademark Office*